UNITED STATES PATENT OFFICE.

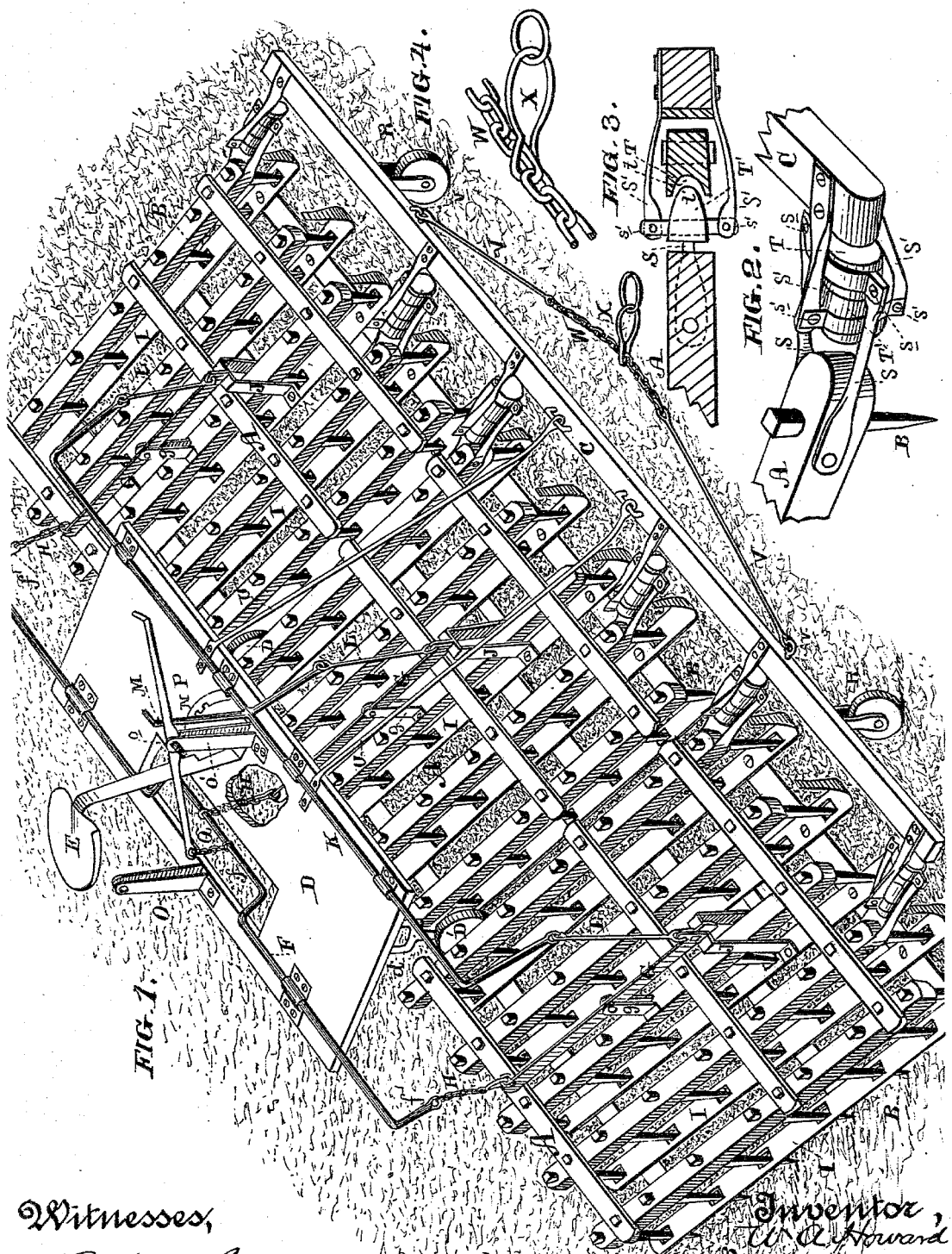

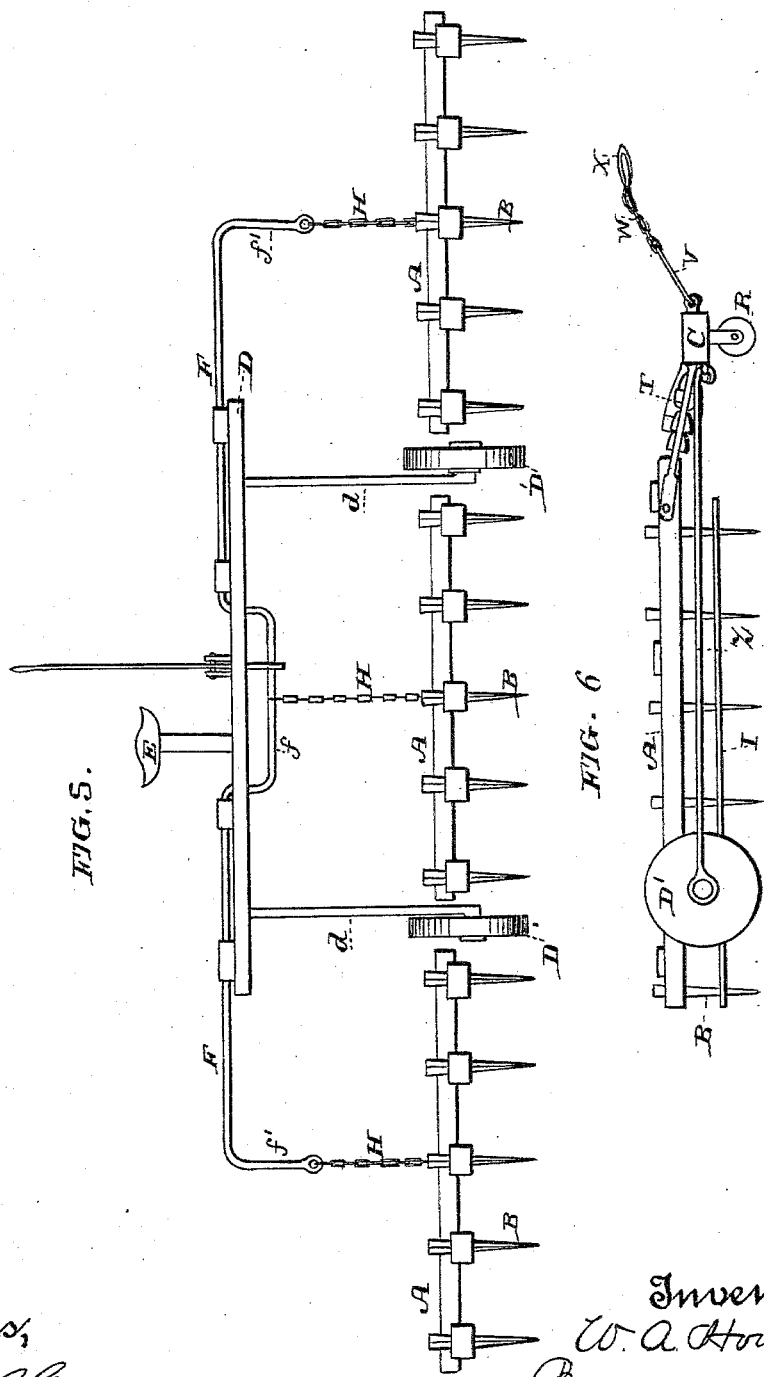

WILLIAM A. HOWARD, OF DIXON, CALIFORNIA.

HARROW.

SPECIFICATION forming part of Letters Patent No. 303,223, dated August 5, 1884.

Application filed March 29, 1884. (No model.)

*To all whom it may concern:*

Be it known that I, WILLIAM A. HOWARD, of Dixon, county of Solano, and State of California, have invented an Improvement in Harrows; and I hereby declare the following to be a full, clear, and exact description thereof.

My invention relates to the class of harrows; and it consists in certain new and useful improvements therein.

These improvements consist in a wheeled platform carrying a seat; in a novel connection between the platform and the harrow-sections, whereby the latter may be raised; in a mechanism for cleaning the harrow-teeth; in the hinge or joint between the evener and the sections, and in a peculiar adjustable draft, all of which I shall hereinafter fully explain.

The object of my invention is to provide a simple, effective, and easily-handled harrow.

Referring to the accompanying drawings, Figure 1 is a perspective view of my harrow. Fig. 2 is a perspective view showing in detail the hinge between the harrow-section and evener. Fig. 3 is a vertical longitudinal section of same. Fig. 4 is a perspective view showing detail of adjustable draft-link. Fig. 5 is a rear elevation of harrow, showing the wheeled platform. Fig. 6 is a side or end view showing rods Z, connecting-wheels D' of the platform with the evener.

A A A are three harrow-sections of ordinary pattern, and having teeth B. These sections are independent of each other, though uniting as a whole through the evener-bar C, with which they are each connected by a peculiar hinge or joint, hereinafter described.

D is a platform having seat E. This platform is supported on legs $d$, passing down between the central harrow-section and the adjoining ones, and having wheels D' on the lower ends traveling on the ground, Fig. 5.

Journaled longitudinally on the platform is a shaft, F, having a central crank, $f$, playing down through an aperture in the platform, and having also crank ends $f'$.

Upon the center of each section of the harrow are secured bearings $g$, in which are pivoted levers G, the rear ends of which are connected by chains H with the cranks $f f'$. Under each section is a skeleton frame, I, consisting of suitable strips of metal perforated, as shown. The frames fit under the sections, the teeth of which pass through their perforations. They fit on the teeth loosely enough to be readily moved up or down. This movement is designed to clean the teeth by scraping them.

Secured to the center of each cleaner-frame I are the forked links J, the legs of which straddle one of the bars of the sections. To the upper ends of these links are pivoted the forward ends of the levers G. By rocking the shaft F, to throw its cranks upwardly, the rear ends of levers G are raised and their forward ends depressed, forcing down the links J and the cleaners I to scrape the teeth. When the links J are forced down to their limit until they rest on the harrow-sections, the continued movement of the shaft F causes a lifting-force to be applied through levers G on the bearings $g$, and the harrow-sections, together with the frames I, are raised clear of the ground on the wheels D' of the platform.

In order to raise and to hold the cleaner-frames up when not in use, I have the crank-shaft K mounted on the platform, and connected with the tops of links J by the rods or chains L. This crank-shaft is operated by a lever, M, which is held wherever adjusted by a rack, N. When the lever is thus set, the cleaners are held up; but when they have to be forced down, as I have described, the lever M must be released to allow the levers G to force down the links J.

The rocking of shaft F is accomplished as follows: Mounted on the rear edge of the platform is a standard, O, and another, O', on the forward edge. P is a lever having connected with one end a chain, Q, the other end of which is connected with the central crank, $f$. This lever is adapted to be pivoted in either standard O O' by means of a removable pin, $o$. When pivoted in the rear standard, it is adapted to be operated by a man walking. When pivoted in the forward standard, it is adapted to be operated by the foot of a man occupying the seat E. This lever rocks shaft F and forces down the cleaners, and raises the harrow-sections in the manner I have already described. For convenience, the chains are connected with the levers by means of snap-hooks.

The evener-bar C is mounted on wheels R. In Figs. 2, 3 I show the joint or hinge by which the harrow-sections are connected with this evener. Bolted to the forward ends of two bars of each section are arms S, lying in a horizontal plane. Bolted to the evener in positions opposite these are arms S', lying in a vertical plane. The ends of these pairs of arms overlap, as shown. Secured between the ends of arms S, by means of suitable ears or lugs s, are pieces T, in the rear ends of which sockets t are made. These sockets may be of any curvilinear form, preferably approximately conical. Secured between the ends of arms S', by suitable ears or lugs, s', are pieces T', the forward ends, t', of which are pointed or rounded in such manner as to fit within the sockets t and form the joint. These coupling-pieces cannot separate entirely, because their rear ends bear too closely against the harrow-bars and evener. Yet the joint is loose enough and of a sufficiently universal character to permit the greatest freedom to each section, though not enough to allow them to come in contact, for the arms hold the joints within limits. There being a great amount of wear upon these hinges or joints, I make the pieces T T' of glass, casting or molding the ears or lugs upon them, or, if not found desirable, forming said lugs by means of metal bands clamped thereon.

Z, Fig. 6, are rods or bars extending from the axles of wheels D' of the platform to the evener, thus connecting them; and U are similar bars forming a connection between the platform and the evener above. They are secured to the evener by a loose joint to permit freedom of movement.

In order to change the line of draft to make the teeth of the sections cut nearer in or farther out of line, I have the following: Secured by a link-joint, v, to the evener are rods V, the free ends of which are connected by a length of chain, W. Upon the chain is a link, X, one end of which is drawn out and made narrow. By fitting this small end on a link of the chain its sides fit in between alternate links, and are held there while the draft is on. When relieved, its small end may be freed and the link moved to a new place on the chain, thus changing the line of draft for the purpose described. When the harrow-sections are raised and carried by the wheels D', their tendency to tip forward, when the wheels are set as far back as shown, is prevented by the wheels R of the evener, which thus carries their front.

Having thus described my invention, what I claim as new, and desire to secure by Letters Patent, is—

1. The harrow-sections and vertically-adjustable cleaner-frames, in combination with the independent wheeled platform D, the links J, secured to the cleaner-frames, and the shafts F and K, with their connections, substantially as herein described.

2. The harrow-sections A, in combination with the independent wheeled platform D, having the standards O O', the rock-shaft F, having cranks $f f'$, the lever P, adapted to be fulcrumed in either standard O O', and the chain Q, connecting said lever with crank $f$, and suitable connections between the cranks $f f'$ and the sections A, whereby the sections may be raised and carried by the wheels of the platform, substantially as herein described.

3. The harrow-sections A and the cleaner-frames I, fitted on their teeth, in combination with the wheeled platform D, the shaft F, having cranks $f f'$, means for rocking said shaft, and the connection between said cranks and the harrow-sections and cleaner-frames, whereby the cleaners are forced down on the teeth and both cleaners and harrow-sections raised from the ground, consisting of the levers G, pivoted on the sections, the forked links J, connecting the levers with the cleaner-frames, and the chains H, connecting the cranks $f f'$ with the levers G, substantially as herein described.

4. The harrow-sections A and cleaner-frames I, in combination with the wheeled platform D, the means for raising and holding said cleaner-frames up, consisting of the crank-shaft K, lever M, rack N, the rods L, and forked links J, and the means for forcing down said cleaner-frames on the teeth and raising them and the harrow-sections from the ground, consisting of the rock-shaft F, having cranks $f f'$, the pivoted levers G, connected with forked links J, and chains H, connecting the cranks $f f'$ with the levers, substantially as herein described.

5. The arms S, extending forward from the harrow-sections, and having the pieces T in their ends, said pieces having sockets $t$ formed in their rear ends, in combination with the arms S', extending backward from the evener-bar, and having the pieces T' in their ends, said pieces having curved forward ends, $t'$, adapted to fit the sockets $t$ of the pieces T and form a coupling or hinge between the harrow-sections and the evener, substantially as herein described.

6. A coupling or hinge between the sections of a harrow and their evener-bar, consisting of glass pieces T T', one formed with a curvilinear socket and the other with a curved head adapted to fit the socket, substantially as and for the purpose herein described.

7. The evener C, loosely-connected rods V, and intervening chain W, in combination with the adjustable narrow-ended link X on the chain, substantially as and for the purpose herein described.

In witness whereof I have hereunto set my hand.

WM. A. HOWARD.

Witnesses:
C. D. COLE,
W. W. DAVIS.